United States Patent [19]

Shimada et al.

[11] Patent Number: 4,811,713
[45] Date of Patent: Mar. 14, 1989

[54] VEHICLE ENGINE CONTROLLER

[75] Inventors: Makoto Shimada, Kyoto, Japan; Takashi Dogahara, Farmington Hills, Mich.

[73] Assignee: Mitsubishi Jidosha Kogyo Kabushiki Kaisha, Tokyo, Japan

[21] Appl. No.: 113,523

[22] Filed: Oct. 28, 1987

[30] Foreign Application Priority Data

Oct. 31, 1986 [JP] Japan ................. 61-260530

[51] Int. Cl.$^4$ ........................ F02D 41/10; F02D 9/02
[52] U.S. Cl. ..................................... 123/399; 123/361
[58] Field of Search ................ 123/340, 352, 361, 399

[56] References Cited

U.S. PATENT DOCUMENTS

| | | | |
|---|---|---|---|
| 4,453,516 | 6/1984 | Filsinger | 123/399 X |
| 4,519,360 | 5/1985 | Murakami | 123/399 |
| 4,671,235 | 6/1987 | Hosaka | 123/399 X |
| 4,750,598 | 6/1988 | Danno et al. | 123/340 X |

FOREIGN PATENT DOCUMENTS 10749 1/1984 Japan ..................... 123/399

Primary Examiner—Tony M. Argenbright

[57] ABSTRACT

Disclosed herein is a device for controlling a vehicle engine by controlling a throttle valve by the drive-by-wire method. Using the fact that an acceleration is proportional to an excess torque, a target torque is determined in accordance with a predetermined functional equation by using as input information a target acceleration determined based on the degree of operation of a man-controlled member, the current running acceleration and the current output torque. A target throttle opening rate is set further from the target torque. The throttle valve is then controlled to achieve the target throttle opening rate to predictably control the acceleration, whereby high-accuracy engine control is materialized and drivability is improved.

15 Claims, 4 Drawing Sheets

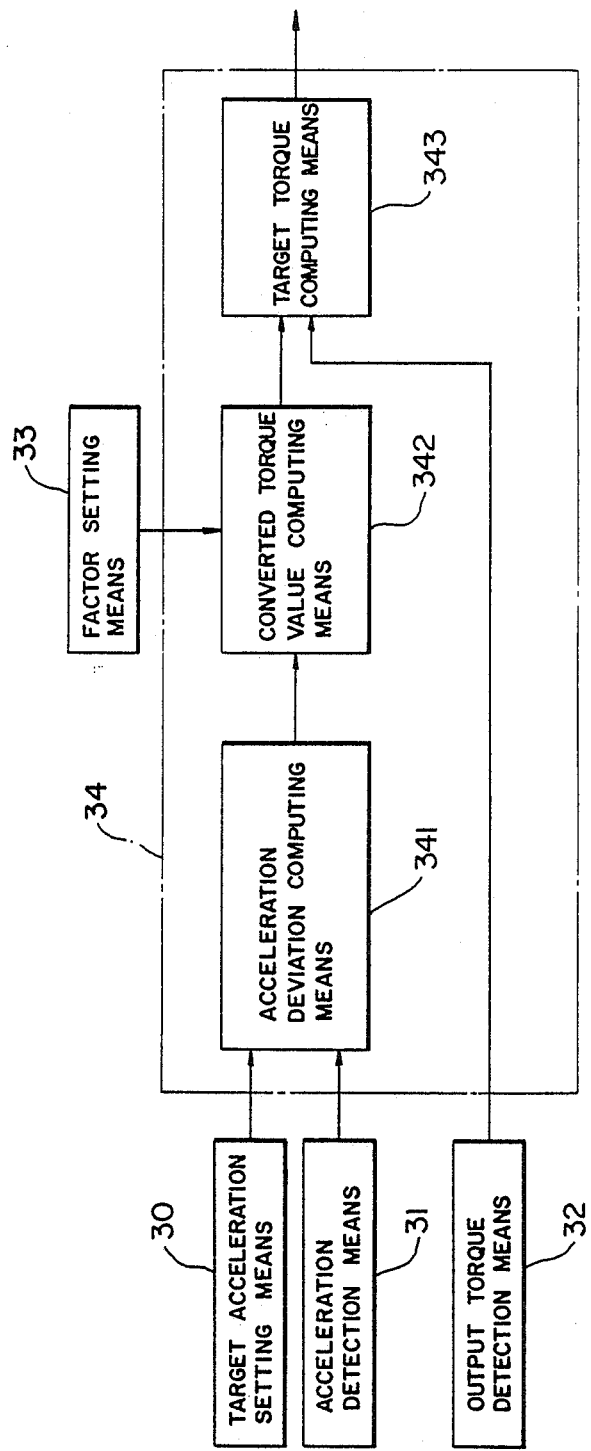

VEHICLE ENGINE CONTROLLER

BACKGROUND OF THE INVENTION (1) Field of the Invention

This invention relates to a controller for a vehicle engine (internal combustion engine) equipped with a power-controlling throttle valve in an intake passage thereof. In particular, the present invention is concerned with a device for controlling a vehicle engine by controlling a throttle valve provided in an intake passage of the engine in accordance with the drive-by-wire method in such a way that instead of mechanically connecting the throttle valve with a mancontrolled member arranged in a vehicle operating room such as the interior of a vehicle, such as an accelerator pedal, the throttle valve is rendered controllable by an actuator such as electric motor, thereby outputting to the actuator a control signal based on the degree of operation of the man-controlled operation member such as the accelerator pedal and permitting the opening/closing control of the throttle valve.

(2) Description of the Prior Art:

A throttle valve interposed in an intake passage of an engine has heretofore been driven by a wire connected to an accelerator pedal.

Such a conventional throttle valve controller of the mechanical link system however involves potential inconvenience that the responsibility may be deteriorated due to slacking or play of the wire and the feeling of the accelerator pedal may be impaired due to twisting, corrosion or the like of the wire.

In an attempt to overcome such potential inconvenience, it has been proposed to drive a throttle valve in accordance with the throttle-by-wire method while using information on the position of an associated accelerator pedal as an input signal as disclosed in U.S. Pat. No. 4,519,360 of May 28, 1985 by way of example. Such conventional controllers cannot however improve the drivability fully, because the opening rate of the throttle valve is in direct 1:1 proportion with the stroke of the accelerator pedal.

SUMMARY OF THE INVENTION

With the foregoing in view, the present invention has as a principal object thereof the provision of a controller for a vehicle engine, which can materialize a high-accuracy engine control and improve the drivability by controlling the acceleration under prediction on the basis of the interesting proportionality of an acceleration to an excess torque in the drive-by-wire method in which the opening rate of a throttle valve is controlled by driving it with an actuator such as electric motor in accordance with the degree of operation (the stroke) of a man-controlled operation member such as accelerator pedal.

A controller according to this invention, which is suitable for use with a vehicle engine mounted on a vehicle and adapted to generate power to drive the vehicle, hence comprises:

a throttle valve interposed in an intake passage of the engine so as to control the power of the engine;

an actuator for driving the throttle valve so as to control the opening rate of the throttle valve;

a man-controlled operation member for controlling the power of the engine;

a means for detecting the degree of operation of the man-controlled operation member;

a means for receiving as an input detection results from the operation-degree detecting means and then setting a target acceleration corresponding to the degree of operation of the man-controlled operation member;

a means for detecting a running acceleration of the vehicle;

a means for detecting a revolution number of the engine;

a means for detecting an output torque of the engine;

a target torque computing means for determining a target torque from a predetermined functional relation by using the target acceleration, running acceleration and output torque as input information;

a means for setting a desired target throttle opening rate determined by the target torque and engine revolution number; and a control means for receiving the target throttle opening rate from the throttle opening rate setting means and outputting a control signal to the actuator so as to achieve the target throttle opening rate.

In the vehicle engine controller of this invention, a target torque is obtained taking a hint from the fact that an acceleration is proportional with an excess torque of an engine, namely, from a predetermined functional equation by using a target acceleration, current running acceleration and current output torque as input information upon controlling the opening rate of a throttle valve. Determined next is a target throttle opening rate which is governed by the target torque and a revolution number of the engine. The acceleration is then controlled under prediction by outputting a control signal in such a way that the target throttle opening rate is achieved, whereby a high-accuracy engine control is materialized and the drivability is improved.

BRIEF DESCRIPTION OF THE DRAWINGS

The above and other objects, features and advantages of the present invention will become apparent from the following description and the appended claims, taken in conjunction with the accompanying drawings, in which:

FIG. 4 is a block diagram showing the construction of a target torque computing means useful in the controller.

DESCRIPTION OF THE PREFERRED EMBODIMENT

Figure 2:
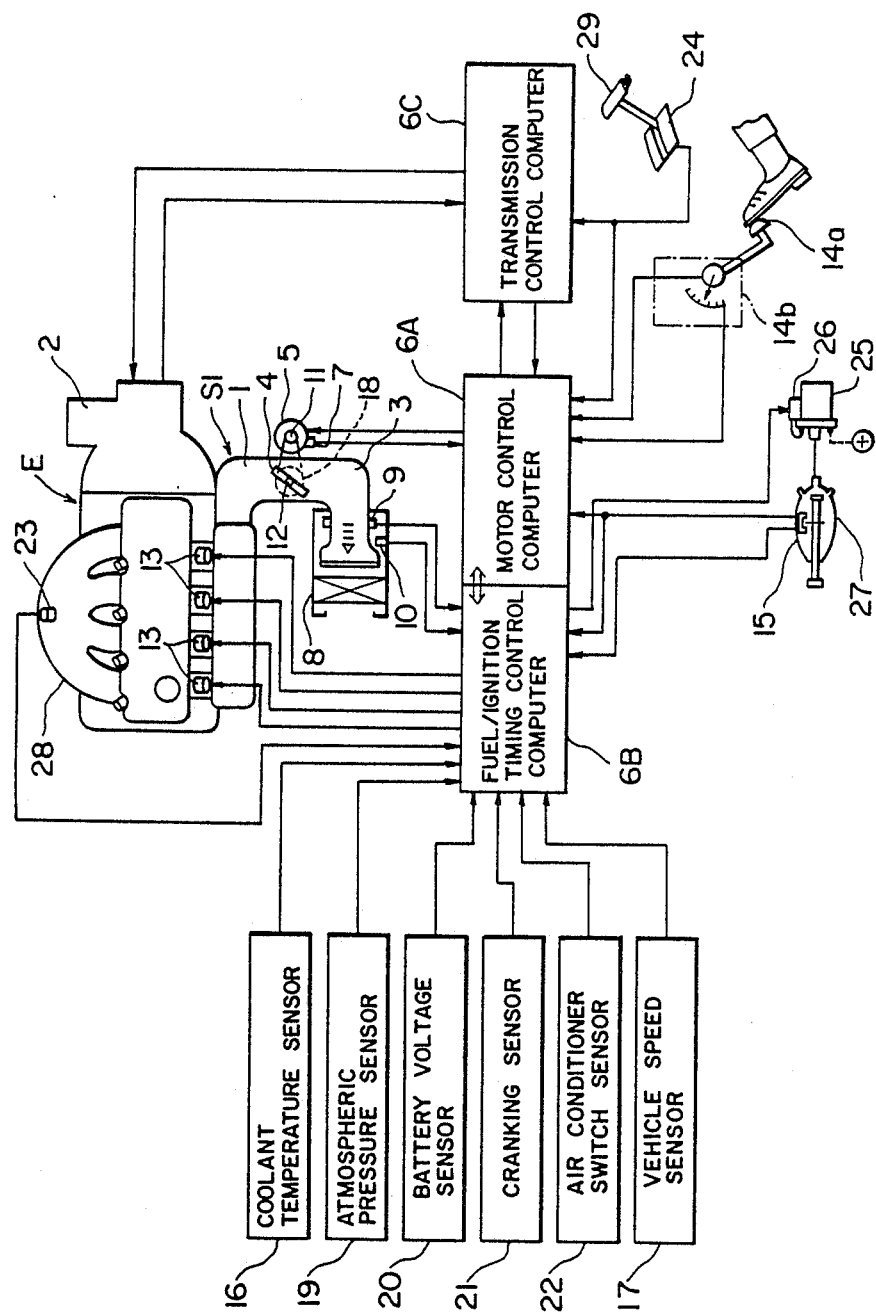
FIG. 2 is a simplified block diagram showing the overall construction of the controller.

As shown in FIG. 2, the illustrated embodiment includes an intake passage 1 which communicates with each combustion chamber of a vehicle engine (for example, an in-line 4-cylinder engine) E equipped with an automatic transmission 2. The intake passage 1 communicating with each cylinder is connected to a surge tank (not illustrated) which constitutes an air intake system $S_1$. This surge tank is in turn in communication with an upstream intake passage 3.

A throttle valve 4 is interposed in the upstream intake passage 3. The opening rate of the throttle valve 4 is controlled by an electric motor 5 as an actuator via a pulley mechanism 18 extending between shafts 11,12.

The electric motor 5 is electrically connected so as to receive electric control signals from a motor control computer 6A. The degree of each drive by the electric motor 5 is detected by a motor position sensor 7. The motor control computer 6A can therefore find out indirectly the opening rate of the throttle valve 4 from results of a detection by the motor position sensor 7. Incidentally, the motor control computer 6A is equipped, as its hardware components, CPU, RAM, ROM and I/O interface.

An air cleaner 8 is also interposed in the upstream intake passage 3 at a point upstream the throttle valve 4. The air cleaner is provided with a Karman vortex airflow sensor 9 and an air temperature sensor 10.

Each cylinder is provided with a fuel injector (electromagnetic fuel injector) 13, which is also arranged in the intake passage 1 at a point near the combustion chamber of the corresponding cylinder. Namely, the engine E is constructed as an engine of the multipoint fuel injection system.

As has been described above, the intake system $S_1$ is composed of the intake passage 1, surge tank, upstream intake passage 3, throttle valve 4, electric motor 5, motor position sensor 7, air cleaner 8, Karman vortex airflow sensor 9, air temperature sensor 10 and injectors 13.

In addition to the motor control computer 6A, there are also provided a fuel/ignition timing control computer 6B for controlling the amount of the fuel to be supplied to each injector 13 and the on/off timing (ignition timing) of a power transistor 26 attached to an ignition coil 25 as well as a transmission control computer 6C for controlling the pressure of a working oil in accordance with the position of the automatic transmission 2.

As illustrated in FIG. 2, these computers 6A,6B,6C are inputted with detection signals from the motor position sensor 7, the Karman vortex airflow sensor 9, the air temperature sensor 10, an accelerator pedal position sensor 14b as a accelerator pedal stroke sensor, an engine revolution number sensor 15, a coolant sensor 16, a vehicle speed sensor 17, an atmospheric pressure sensor 19, a battery voltage sensor 20, a cranking sensor 21, an air conditioner switch sensor 22, an O₂ sensor 23, and a select switch sensor 24.

Here, the motor position sensor 7 detects the degree of a drive by the electric motor 5 to determine the corresponding opening rate of the throttle valve 4. The Karman vortex airflow sensor 9 detects the volume of intake air from the number of Karman vortexes. The air temperature sensor 10 detects the temperature of the intake air, while the accelerator pedal position sensor 14b detects each stroke of an accelerator pedal 14a provided as a man-controlled operation member in front of the driver's seat of a vehicle. The engine revolution number sensor 15 detects the revolution number of the engine E by obtaining crank angle signals from a distributor 27. The coolant temperature sensor 16 detects the temperature of the cooling water of the engine E. The vehicle speed sensor 17 detects the speed of the vehicle. The atmospheric pressure sensor 19 detects the atmospheric pressure, while the battery voltage sensor 20 detects the voltage of a battery. The cranking sensor 21 detects each start-up of the engine E. The air conditioner switch sensor 22 detects the state of operation of an air conditioner, especially, the on/off state thereof.

The O₂ sensor 23 detects the concentration of oxygen in an exhaust in an exhaust passage 28. The select switch sensor 24 outputs a signal corresponding to the position of a select lever 29.

By the way, the motor control computer 6A has the following function and means from the viewpoint of its software.

Figure 1:
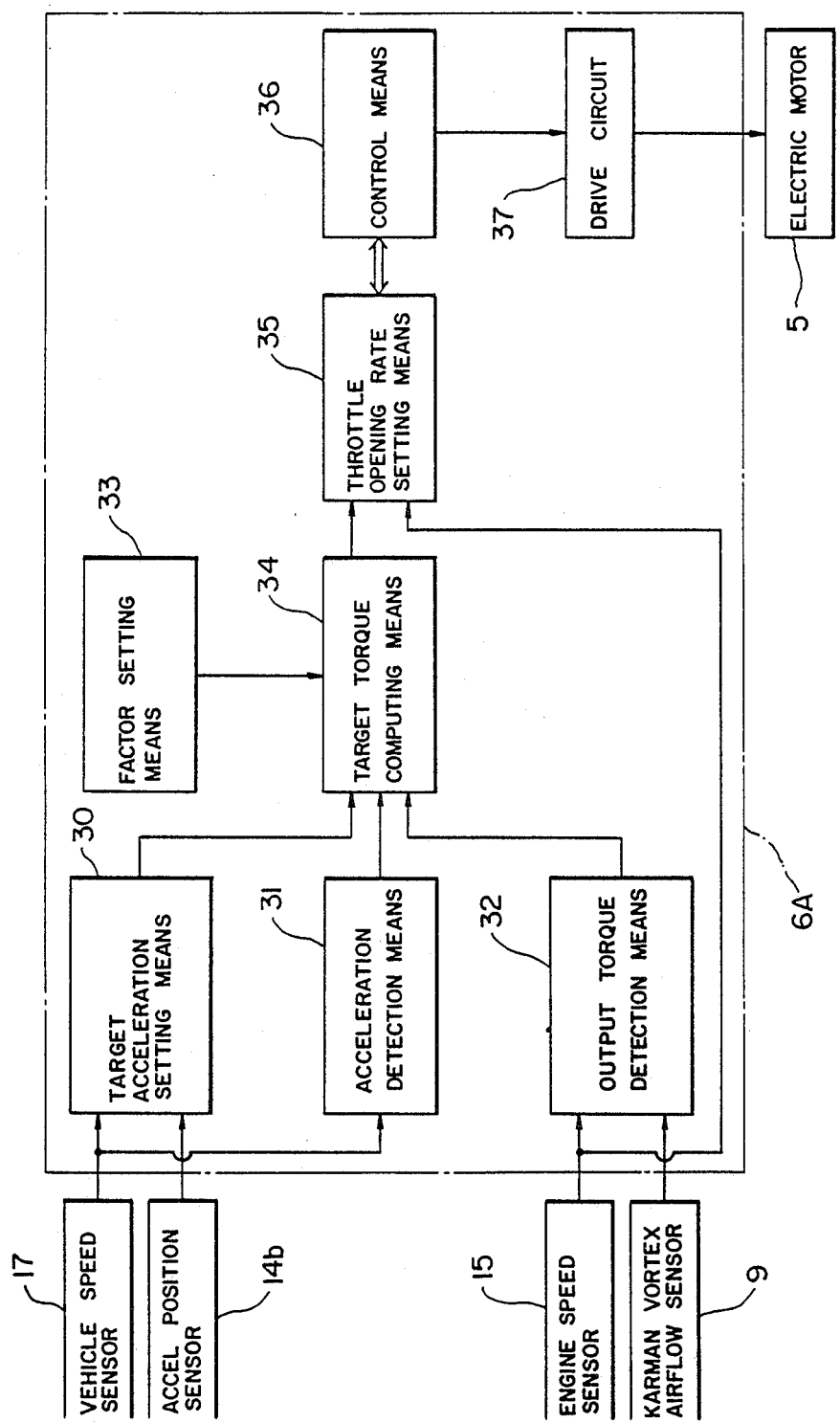
FIG. 1 is a partial block diagram of a vehicle engine controller according to one embodiment of this invention.

First of all, the motor control computer 6A is equipped with a target acceleration setting means 30 as shown in FIG. 1. This target acceleration setting means 30 is constructed as a two-dimensional map (memory means) in which a target acceleration TA is determined in accordance with information on a throttle opening rate and that on a vehicle speed. The target acceleration TA which has been stored in advance can be read out in accordance with the throttle opening rate and vehicle speed upon receipt of signals from both vehicle speed sensor 17 and accelerator pedal position sensor 14b as address signals.

The motor control computer 6A is also equipped with an acceleration detecting means 31 which determines a running acceleration (actual acceleration) RA by differentiating signals from the vehicle speed sensor 17.

Further, the motor control computer 6A is also equipped with an output torque detecting means 32. The output torque detecting means 32 is constructed as a two-dimensional map (memory means) in which a current output torque COT is determined by information obtained by dividing an intake air volume A with an engine revolution number N (this information A/N has engine load information) and information on the revolution number of the engine. Upon receipt of engine load information A/N and engine revolution number N as address signals, the current output torque COT which has been stored in advance can be read out from the two-dimensional map in accordance with the engine load information A/N and engine revolution number N.

The motor control computer is equipped further with a target torque computing means 34 which determines a target torque TT by multiplying the difference, which has been obtained by subtracting the running acceleration RA from the target acceleration TA, with a desired factor and then adding the current output torque COT to the product of the multiplication.

Namely, the target torque computing means 34 performs computation of the following equation to determine the target torque TT upon receipt of signals respectively from the target acceleration setting means 30, acceleration detecting means 31, output torque detecting means 32 and factor setting means 33.

$$\text{Target torque} = (Wr/g) \times K_1 \times (TA - CRA) + COT \quad (1)$$

where
- W: vehicle weight,
- r: effective tire radius,
- g: gravitational acceleration,
- $K_1$: correction factor taking into consideration inertia of the engine E, automatic transmission 2, tires, etc.,
- TA: target acceleration,
- CRA: current running acceleration of the vehicle, and
- COT: current output torque of the engine.

These values W, r, g and $K_1$ are set by the factor setting means 33.

The target torque computing means 34 is thus composed, as shown in FIG. 4, of an acceleration deviation computing means 341 for determining the difference between the target acceleration TA and running acceleration RA by subtracting the latter RA from the former TA, a converted torque value computing means 342 for multiplying computation results from the acceleration deviation computing means 341 with the predetermined factor $(Wr/g) \times K_1$ to determine a converted torque value, and a target torque calculating means 343 for adding an output torque OT to the converted torque value from the converted torque value computing means 342.

The above-described calculation of the torque is performed by converting all the variables to their corresponding values at the 1st position of the transmission, so that the calculation by the motor control computer 6A is facilitated. For this purpose, a detection signal from the select switch 24 is inputted in the motor control computer 6A in order to determine, so that a detection is carried out to determine in which position the transmission is now shifted.

Figure 3:
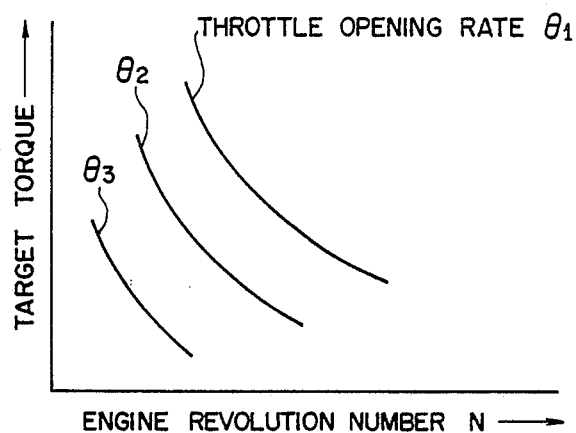
FIG. 3 diagrammatically illustrates the function of the controller.

The motor control computer 6A is additionally equipped, as shown in FIG. 3, with a throttle opening rate setting means 35 for setting a desired target throttle opening rate $\theta$ which is determined by the target torque TT and engine revolution number N. Namely, the throttle opening rate setting means 35 is constructed as a two-dimensional map (memory means) in which the target throttle opening rate $\theta$ is determined by the target torque TT and engine revolution number N in such a relation as shown in FIG. 3. Upon receipt of the target torque TT and engine revolution number N as address signals, the target throttle opening rate which has been stored in advance can be read out from the two-dimensional map in accordance with the target torque TT and engine revolution number N.

The motor control computer 6A is further equipped with a control means 36 for outputting an electrical control signal to the electric motor 5 via a drive circuit 37 so as to achieve the target throttle opening rate obtained by the throttle opening rate setting means 35 in the manner described above.

Both fuel/ignition timing control computer 6B and transmission control computer 6C are also equipped with CPU, RAM, ROM and a suitable I/O interface. They are equipped with functions and means to perform their respective controls. Since conventional functions and means can be used, their detailed description is omitted.

The motor control computer 6A, fuel/ignition timing control computer 6B and transmission control computer 6C are connected to one another by bus lines.

Owing to the construction described above, the throttle valve control by the illustrated device is performed in the following manner. While the vehicle is driven, the target acceleration TA is read out at the target acceleration setting means 30 from vehicle speed information and throttle opening rate information. At the same time, signals from the vehicle speed sensor 17 are differentiated at the acceleration detecting means 31 and the running acceleration RA is outputted. Furthermore, the current output torque COT is read out from engine revolution number information and load information at the output torque detecting means 32.

These target acceleration TA, running acceleration (actual acceleration) RA, current output torque COT and factor information, $(Wr/g) \times K_1$ or W, r, g and $K_1$, from the factor setting means 33 are then inputted to the target torque computing means 34. Upon receipt of these information, the target torque computing means 34 performs thereinside computation of the equation (1) so as to determine the target torque TT.

Upon determination of the target torque TT in the above-described manner, the desired target throttle opening rate is selected from the map of FIG. 3 at the throttle opening rate setting means 35 and a control signal is then outputted from the control means 36 via the drive circuit 37 so as to achieve the thus-selected target throttle opening rate. Since the throttle valve 4 is controlled at the desired target throttle opening rate by the control signal, the state of power output of the engine E is controlled correspondingly so that the vehicle is allowed to run at the target acceleration.

Taking a hint from the fact that an acceleration is proportional to an excess torque, namely, the difference between the torque of an output shaft and the torque of running resistance, the target torque is determined as a logic to achieve the target acceleration from the above equation (1). Further, the desired throttle opening rate is selected from the target torque and the throttle valve 4 is then controlled to achieve this opening rate. As a result, the accuracy of the acceleration control under prediction is higher than that performed by the PID control and moreover, the accuracy of the control is not reduced even if disturbance such as sloping road or windage loss exists.

Incidentally, the running acceleration may be detected directly by a gravity sensor known to date.

As an engine load, the throttle opening rate or intake passage pressure may also be used an engine load instead of the A/N information.

The device of this invention may also be applied to an engine of the so-called single-point fuel injection method in which the fuel is supplied at a point of the intake passage, said point being upstream the branching portion of the manifold.

Engines to which the present invention is applicable are not necessarily limited to in-line 4-cylinder engines but may be applied to various internal combustion engines.

Further, the throttle valve 4 may be connected directly to the electric motor 5 instead of connecting the electric motor 5 and throttle valve 4 by way of the pulley mechanism 18, whereby the throttle valve 4 may be driven directly by the electric motor 5. In this case, a stepper motor is used as the electric motor. Where a stepper motor is used in the above-described manner, the degree of rotation of the step motor, for example, the degree of positive rotation in the case of clockwise rotation or the degree of negative rotation in the case of counterclockwise rotation, namely, the throttle opening rate can be detected by setting the initial position of the motor first of all and then counting the number of subsequent steps. It is not necessary to provide the motor position sensor 7 externally with the computer in this case.

Having now fully described the invention, it will be apparent to one of ordinary skill in the art that many changes and modifications can be made thereto without departing from the spirit or scope of the invention as set forth herein.

We claim:

1. A controller for a vehicle engine mounted on a vehicle and adapted to generate power to drive the vehicle, comprising:

a throttle valve interposed in an intake passage of the engine so as to control the power of the engine;

an actuator for driving the throttle valve so as to control the opening rate of the throttle valve;

a man-controlled operation member for controlling the power of the engine;

a means for detecting the degree of operation of the man-controlled operation member;

a means for receiving as an input detection results from the operation-degree detecting means and then setting a target acceleration corresponding to the degree of operation of the man-controlled operation member;

a means for detecting a running acceleration of the vehicle;

a means for detecting a revolution number of the engine;

a means for detecting an output torque of the engine;

a target torque computing means for determining a target torque from a predetermined functional relation by using the target acceleration, running acceleration and output torque as input information;

a means for setting a desired target throttle opening rate determined by the target torque and engine revolution number; and a control means for receiving the target throttle opening rate from the throttle opening rate setting means and outputting a control signal to the actuator so as to achieve the target throttle opening rate.

2. The controller as claimed in claim 1, wherein the target torque computing means determines the target torque by multiplying the difference, which has been obtained by subtracting the running acceleration from the target acceleration, with a desired factor and then adding the output torque to the product of the multiplication.

3. The controller as claimed in claim 2, wherein the target torque computing means computes the following equation to determine the target torque.

$$\text{Target torque} = (Wr/g) \times K_1 \times (TA - CRA) + COT$$

where
- W: vehicle weight,
- r: effective tire radius,
- g: gravitational acceleration,
- $K_1$: correction factor taking into consideration inertia of the engine, tires, etc.,
- TA: target acceleration,
- CRA: current running acceleration of the vehicle, and
- COT: current output torque of the engine.

4. The controller as claimed in claim 2, wherein the target torque computing means comprises:

an acceleration deviation computing means for determining the difference;

a means for computing a converted torque value by multiplying computation results from the acceleration deviation computing means with the desired factor; and a target torque calculating means for adding the output torque to the converted torque value from the converted torque value computing means.

5. The controller as claimed in claim 1, wherein the target acceleration is set based on the degree of operation of the man-controlled operation member detected by the operation-degree detecting means and vehicle speed information detected by a vehicle speed detecting means.

6. The controller as claimed in claim 5, wherein the target acceleration setting means is equipped with a memory means for storing the functional relation between the degree of operation of the mancontrolled operation member, vehicle speed information and target acceleration, whereby the target acceleration corresponding to the degree of operation of the man-controlled operation member and the vehicle speed information can be read out from the memory means by using the degree of operation of the man-controlled operation member detected by the operation-degree detecting means and the vehicle speed as input information.

7. The controller as claimed in claim 1, wherein the throttle opening rate setting means is equipped with a memory means for storing the functional relation between the target torque, engine revolution number and throttle opening rate, whereby the throttle opening rate corresponding to the target torque and engine revolution number can be read out from the memory means by using the target torque and engine revolution number as input information.

8. The controller as claimed in claim 1, wherein the output torque detecting means detects the output torque from information on the load and revolution number of the engine.

9. The controller as claimed in claim 8, wherein the output torque detecting means is equipped with a memory means for storing the functional relation between the load information and revolution number information of the engine, whereby the output torque corresponding to the load information and revolution number information of the engine can be read out from the memory means by using the load information and revolution number information of the engine as input information.

10. The controller as claimed in claim 8, wherein information on a quotient obtained by dividing the volume of intake air of the engine with the revolution number of the engine is used as the load information of the engine.

11. The controller as claimed in claim 8, wherein information on the opening rate of the throttle valve is used as the load information of the engine.

12. The controller as claimed in claim 8, wherein information on the pressure in the intake passage of the engine is used as the load information of the engine.

13. The controller as claimed in claim 1, wherein the acceleration detecting means detects acceleration information by differentiating vehicle speed information from the vehicle speed detecting means.

14. The controller as claimed in claim 1, wherein an electric motor is used as the actuator and an electric control signal containing information on the target throttle opening degree is outputted from the control means to the electric motor.

15. The controller as claimed in claim 1, wherein the man-controlled operation member is an accelerator pedal and the operation-degree detecting means detects the stroke of the accelerator pedal.

* * * * *